(12) United States Patent
Zhang et al.

(10) Patent No.: US 11,436,261 B2
(45) Date of Patent: Sep. 6, 2022

(54) SHUFFLE-LESS RECLUSTERING OF CLUSTERED TABLES

(71) Applicant: Google LLC, Mountain View, CA (US)

(72) Inventors: Hua Zhang, Mountain View, CA (US); Pavan Edara, Mountain View, CA (US); Nhan Nguyen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 221 days.

(21) Appl. No.: 16/848,810

(22) Filed: Apr. 14, 2020

(65) Prior Publication Data

US 2021/0319044 A1    Oct. 14, 2021

(51) Int. Cl.
| | |
|---|---|
| *G06F 16/00* | (2019.01) |
| *G06F 16/28* | (2019.01) |
| *G06F 21/64* | (2013.01) |

(52) U.S. Cl.
CPC ............ *G06F 16/285* (2019.01); *G06F 21/64* (2013.01)

(58) Field of Classification Search
None
See application file for complete search history.

(56) References Cited

U.S. PATENT DOCUMENTS

| | | | |
|---|---|---|---|
| 9,607,019 B1* | 3/2017 | Swift | ................. G06F 16/2255 |
| 2011/0302226 A1 | 12/2011 | Abadi et al. | |
| 2014/0344221 A1* | 11/2014 | Novik | ................. G06F 16/256 |
| | | | 707/633 |
| 2017/0046394 A1 | 2/2017 | Skidanov et al. | |

FOREIGN PATENT DOCUMENTS

CN    110100242 A    8/2019

OTHER PUBLICATIONS

International Search Report for the related Application No. PCT/US2021/026932, dated Apr. 12, 2021, 102 pages.
Azza Abouzied et al : "Invisible loading", Extending Database Technology, ACM, 2 Penn Plaza, Suite 701 N Ew York NY 10121-0701 USA, Mar. 18, 2013 (Mar. 18, 2013), pp. 1-10, XP058014223, DOI: 10.1145/2452376.2452377 ISBN: 978-1-4503-1597-5 p. 2, right-hand column, paragraph 1-p. 6, left-hand column, paragraph I; figure 1, 12 pages.

\* cited by examiner

*Primary Examiner* — Anhtai V Tran
(74) *Attorney, Agent, or Firm* — Honigman LLP; Brett A. Krueger

(57) ABSTRACT

A method for shuffle-less reclustering of clustered tables includes receiving a first and second group of clustered data blocks sorted by a clustering key value. A range of clustering key values of one or more the data blocks in the second group overlaps with the range of clustering key values of a data block in the first group. The method also includes generating split points for partitioning the first and second groups of clustered data blocks into a third group. The method also includes partitioning using the split points, the first and second groups into the third group. Each data block in the third group includes a range of clustering key values that do not overlap with any other data block in the third group. Each split point defines an upper limit or lower limit for the range of clustering key values a data block in the third group.

22 Claims, 8 Drawing Sheets

SHUFFLE-LESS RECLUSTERING OF CLUSTERED TABLES

TECHNICAL FIELD

This disclosure relates to shuffle-less reclustering of clustered tables.

BACKGROUND

As cloud storage has become more popular, clustered data structures (e.g., a column data store) are increasingly being used to reduce query cost and improve query performance by clustering data into non-overlapping data blocks. Because the size of many tables necessitates splitting the table across many different servers, clusters of data blocks are typically sorted by a clustering key in order to co-locate related data. Each data block includes a range of clustering key values. Typically, the range of the clustering key values associated with each data block do not overlap any other data block within the clustered data blocks. When new data is appended to the clustered data blocks, often the ranges of the clustering key values of the new data blocks will have some overlap with the original data blocks, and the data blocks must be sorted again to maintain performance.

SUMMARY

One aspect of the disclosure provides a method for shuffle-less reclustering of clustered tables. The method includes receiving, at data processing hardware, a first group of clustered data blocks sorted by a clustering key value. The clustered data blocks in the first group of clustered data blocks may include a respective range of the clustering key values that do not overlap with any of the ranges of clustering key values of the other clustered data blocks in the first group of clustered data blocks. The method also includes receiving, at the data processing hardware, a second group of clustered data blocks sorted by the clustering key value. Each clustered data block in the second group of clustered data blocks may include a respective range of clustering key values that do not overlap with any of the ranges of clustering key values of the other clustered data blocks in the second group of clustered data blocks. The method also includes generating, by the data processing hardware, one or more split points for partitioning the first and second groups of clustered data blocks into a third group of clustered data blocks. The method also includes partitioning, by the data processing hardware, using the one or more generated split points, the first and second groups of clustered data blocks into the third group of clustered data blocks. Each clustered data block in the third group of clustered data blocks may include a respective range of clustering key values that do not overlap with any of the ranges of clustering key values of the other clustered data blocks in the third group of clustered data blocks. Each split point of the one or more generated split points defines an upper limit or a lower limit for the respective range of clustering key values of one of the clustered data blocks in the third group of clustered data blocks.

Implementations of the disclosure may include one or more of the following optional features. In some implementations a columnar database table stores the first and second groups of clustered data blocks. A number of the one or more split points generated may be based on a number of data blocks in the first and second groups of clustered data blocks and a size of each of the data blocks. In some examples, partitioning the first and second groups of clustered data blocks into the third group of clustered data blocks occurs without performing any shuffling operation on the data blocks in the first and second groups of clustered data blocks.

In some examples, the method further includes identifying which clustering key values in the first group of clustered data blocks and the second group of clustered data blocks fall between adjacent split points and for each clustered data block in the third group of clustered data blocks, merging the identified clustering key values that fall within the corresponding adjacent split points. At least one clustered data block in the third group of clustered data blocks may include a portion of the respective range from one of the data blocks of the first or second groups of clustered data blocks that does not overlap with any of the respective ranges of the other clustered data blocks of the other one of the first or second groups of clustered data blocks.

Additionally, one clustered data block in the third group of clustered data blocks may include a portion of the respective range from one of the data blocks of the first or second groups of clustered data blocks and one of the data blocks from the other one of the first or second groups of clustered data blocks. At least one clustered data block in the third group of clustered data blocks may include a portion of the respective range from two of the data blocks of the first or second groups of clustered data blocks and one of the data blocks from the other one of the first or second groups of clustered data blocks.

Optionally, generating the one or more split points includes determining a plurality of quantiles for the first and second groups of clustered data blocks and each split point of the one or more split points corresponds to a different quantile of the plurality of quantiles. In some examples, the method further includes determining, by the data processing hardware, a first sum of data values associated with the first and second groups of clustered data blocks and determining, by the data processing hardware, a second sum of data values associated with the third group of clustered data blocks. The method may also include verifying, by the data processing hardware, that the first sum is equivalent to the second sum. In some examples, the respective range of clustering key values of one or more the clustered data blocks in the second group of clustered data blocks overlaps with the respective range of clustering key values of at least one of the clustered data blocks in the first group of clustered data blocks.

Another aspect of the disclosure provides a system of shuffle-less reclustering of clustered tables. The system includes memory hardware in communication with the data processing hardware. The memory hardware stores instructions that when executed on the data processing hardware cause the data processing hardware to perform operations. The operations include receiving, at data processing hardware, a first group of clustered data blocks sorted by a clustering key value. The clustered data block in the first group of clustered data blocks includes a respective range of the clustering key values that do not overlap with any of the ranges of clustering key values of the other clustered data blocks in the first group of clustered data blocks. The operation also includes receiving a second group of clustered data blocks sorted by the clustering key value. Each clustered data block in the second group of clustered data blocks includes a respective range of clustering key values that do not overlap with any of the ranges of clustering key values of the other clustered data blocks in the second group of clustered data blocks. The operation also includes generating one or more split points for partitioning the first and second groups of clustered data blocks into a third group of clustered data blocks. The operations also include partitioning using the one or more generated split points, the first and second groups of clustered data blocks into the third group of clustered data blocks. Each clustered data block in the third group of clustered data blocks may include a respective range of clustering key values that do not overlap with any of the ranges of clustering key values of the other clustered data blocks in the third group of clustered data blocks and each split point of the one or more generated split points defines an upper limit or a lower limit for the respective range of clustering key values of one of the clustered data blocks in the third group of clustered data blocks.

Implementations of the disclosure may include one or more of the following optional features. In some implementations a columnar database table stores the first and second groups of clustered data blocks. A number of the one or more split points generated is based on a number of data blocks in the first and second groups of clustered data blocks and a size of each of the data blocks. Partitioning the first and second groups of clustered data blocks into the third group of clustered data blocks occurs without performing any shuffling operation on the data blocks in the first and second groups of clustered data blocks.

In some examples, the operations include identifying which clustering key values in the first group of clustered data blocks and the second group of clustered data blocks fall between adjacent split points and for each clustered data block in the third group of clustered data blocks and merging the identified clustering key values that fall within the corresponding adjacent split points. At least one clustered data block in the third group of clustered data blocks may include a portion of the respective range from one of the data blocks of the first or second groups of clustered data blocks that does not overlap with any of the respective ranges of the other clustered data blocks of the other one of the first or second groups of clustered data blocks.

Additionally, one clustered data block in the third group of clustered data blocks may include a portion of the respective range from one of the data blocks of the first or second groups of clustered data blocks and one of the data blocks from the other one of the first or second groups of clustered data blocks. At least one clustered data block in the third group of clustered data blocks may include a portion of the respective range from two of the data blocks of the first or second groups of clustered data blocks and one of the data blocks from the other one of the first or second groups of clustered data blocks.

Optionally, generating the one or more split points may include determining a plurality of quantiles for the first and second groups of clustered data blocks and each split point of the one or more split points corresponds to a different quantile of the plurality of quantiles. In some examples, the operations include determining a first sum of data values associated with the first and second groups of clustered data blocks and determining a second sum of data values associated with the third group of clustered data blocks. The operations may also include verifying that the first sum is equivalent to the second sum. In some examples, the respective range of clustering key values of one or more the clustered data blocks in the second group of clustered data blocks overlaps with the respective range of clustering key values of at least one of the clustered data blocks in the first group of clustered data blocks.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Distributed storage (i.e., cloud storage) has been increasingly used to store tables of massive size. It is not uncommon for a table to have a size of multiple terabytes or even petabytes and to include millions of entries (i.e., data blocks). Clustered data structures (e.g., a column data store) are increasingly being used to reduce query cost and improve query performance by clustering data into non-overlapping data blocks. With clusters of data blocks, data blocks are typically sorted by a clustering key, with each data block including a range of clustering key values. Typically, the range of the clustering key values associated with each data block do not overlap any other data block within the clustered data blocks. When new data is appended to the clustered data blocks, often the ranges of the clustering key values of the new data blocks will have some overlap with the original data blocks, and to maintain an optimal clustering state, the data blocks must be reclustered. This is normally accomplished by shuffling the data, which involves writing some or all of the data out to a new location, which is computationally expensive and slow.

Implementations herein are directed toward a data block reclusterer that reclusters data without requiring shuffling. The data block reclusterer receives a first and second group of clustered data blocks sorted by a clustering key value. The data block reclusterer generates one or more split points for partitioning the first and second group of clustered data blocks into a third group of clustered data blocks. The data block reclusterer partitions, using the one or more split points, the first and second groups of clustered data blocks into the third group of clustered data blocks.

Figure 1:
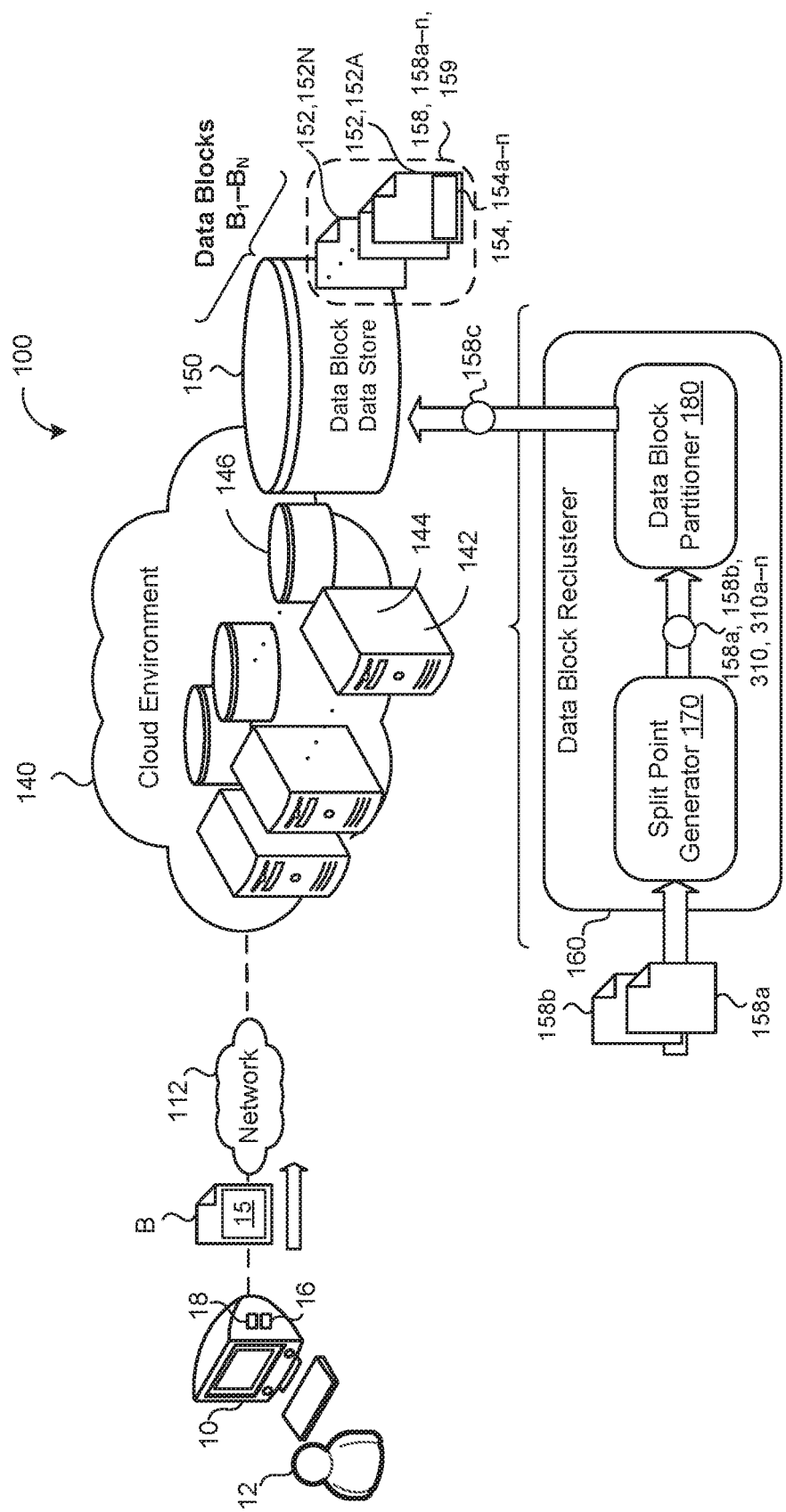
FIG. 1 is a schematic view of an example system for shuffle-less reclustering of clustered tables.

Referring now to FIG. 1, in some implementations, an example system 100 includes a remote system 140. The remote system 140 may be a single computer, multiple computers, or a distributed system (e.g., a cloud environment) having scalable/elastic computing resources 144 (e.g., data processing hardware) and/or storage resources 142 (e.g., memory hardware). A data store 146 (i.e., a remote storage device 146) may be overlain on the storage resources 142 to allow scalable use of the storage resources 142 by one or more of the client or computing resources 144. The data store 146 includes a data block data store 150 configured to store a plurality of data blocks 152, 152a-n within a group 158, 158a-n of clustered data blocks 152. The data store 150 may store any number of groups 158 of clustered data blocks 152 at any point in time. In some examples, the clustered data blocks are stored within a columnar database table or clustered table 159.

Each group of clustered data blocks is sorted by a clustering key value 154, 154a-n. For example, in the clustered table 159 (i.e., one or more groups 158 of clustered data blocks 152), one or more columns of the table 159 is selected to represent the clustering key with each row of the table 159 having a corresponding clustering key value 154. The data of the clustered table 159 is organized around the clustering key to, for example, co-locate related data, as large tables 159 are typically split into multiple data blocks 152 stored on multiple different servers. Each data block 152 in the group 158 of clustered data blocks 152 includes a range of clustering key values 154 that do not overlap with any of the ranges of clustering key values 154 of the other data blocks 152 in the same group 158.

The remote system 140 is configured to receive tabled data 14. For example, the remote system 140 receives the tabled data 14 from a user device 10 associated with a respective user 12 in communication with a remote system 140 via a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). In another example, the remote system 140 receives the tabled data 14 from another a different table stored on the data store 150 or from another remote system 140.

In some implementations, the remote system 140 generates a first group 158a of clustered data blocks 152 from the tabled data 14 to form a clustered table 159. The remote system 140 organizes the tabled data 14 based on a clustering key 15 and splits the tabled data 14 into a plurality of clustered data blocks 152 with each clustered data block 152 including a respective range of the clustering key values 154 that do not overlap with any of the ranges of clustering key values 154 of the other clustered data blocks 152 in the first group 158a of clustered data blocks 152. That is, each clustered data block 152 stores a portion of the tabled data 14 within the clustered table 159. The first group 158a is stored at the data block data store 150.

In some examples, the remote system 140 receives (e.g., from the user device 10) additional tabled data 14 to add to the clustered table 159. The remote system 140 generates a second group 158b of clustered data blocks 152 from the additional tabled data 14. Each clustered data block 152 in the second group 158b includes a respective range of clustering key values 154 that do not overlap with any of the ranges of clustering key values 154 of the other clustered data blocks 152 in the second group 158b. However, the respective range of clustering key values 154 of one or more of the clustered data blocks 152 in the second group 158b may overlap with the respective range of clustering key values 154 of at least one of the clustered data blocks 152 in the first group 158a of clustered data blocks 152. That is, at least one data block 152 of the second group 158b may have a range of clustering key values 154 that overlaps with a range of clustering key values 154 of a data block 152 of the first group 158a of the clustered table 159.

The remote system 140 executes a data block reclusterer 160 to recluster the first group 158a and second group 158b of data blocks 152. As discussed in more detail below, a split point generator 170 of data block reclusterer 160 receives the first and second groups 158a, 158b and generates one or more split points 310, 310a-n (FIG. 2B) for partitioning the first and second groups 158a, 158b of clustered data blocks 152 into a third group 158c of clustered data blocks 152. Each split point 310 defines an upper limit or a lower limit for the respective range of clustering key values 154 of one of the clustered data blocks 152 in the third group 158c of clustered data blocks 152. The split point generator 170 passes the first and second groups 158a, 158b and the one or more split points 310 to a data block partitioner 180.

The data block partitioner 180 partitions, using the one or more generated split points 310, the first and second groups 158a, 158b of clustered data blocks 152 into the third group 158c of clustered data blocks 152. Each clustered data block 152 in the third group 158c includes a respective range of clustering key values 154 that do not overlap with any of the ranges of clustering key values 154 of the other clustered data blocks 152 in the third group 158c. That is, the data block partitioner 180 reclusters the data blocks 152 of the first and second groups 158a, 158b (using the split points 310) such that there is no longer overlap in the ranges of clustering key values 154 among any of the data blocks 152. The data block partitioner 180 partitions the first and second groups 158a, 158b of clustered data blocks 152 into the third group 158c of clustered data blocks 152 without performing any shuffling operation on the data blocks 152 in the first and second groups 158a, 158b so that performance characteristics of clustered tables is maintained without the associated cost of shuffling data. The data block partitioner 180 stores the data blocks 152 of the third group 158c into the data store 150.

Figure 2A:
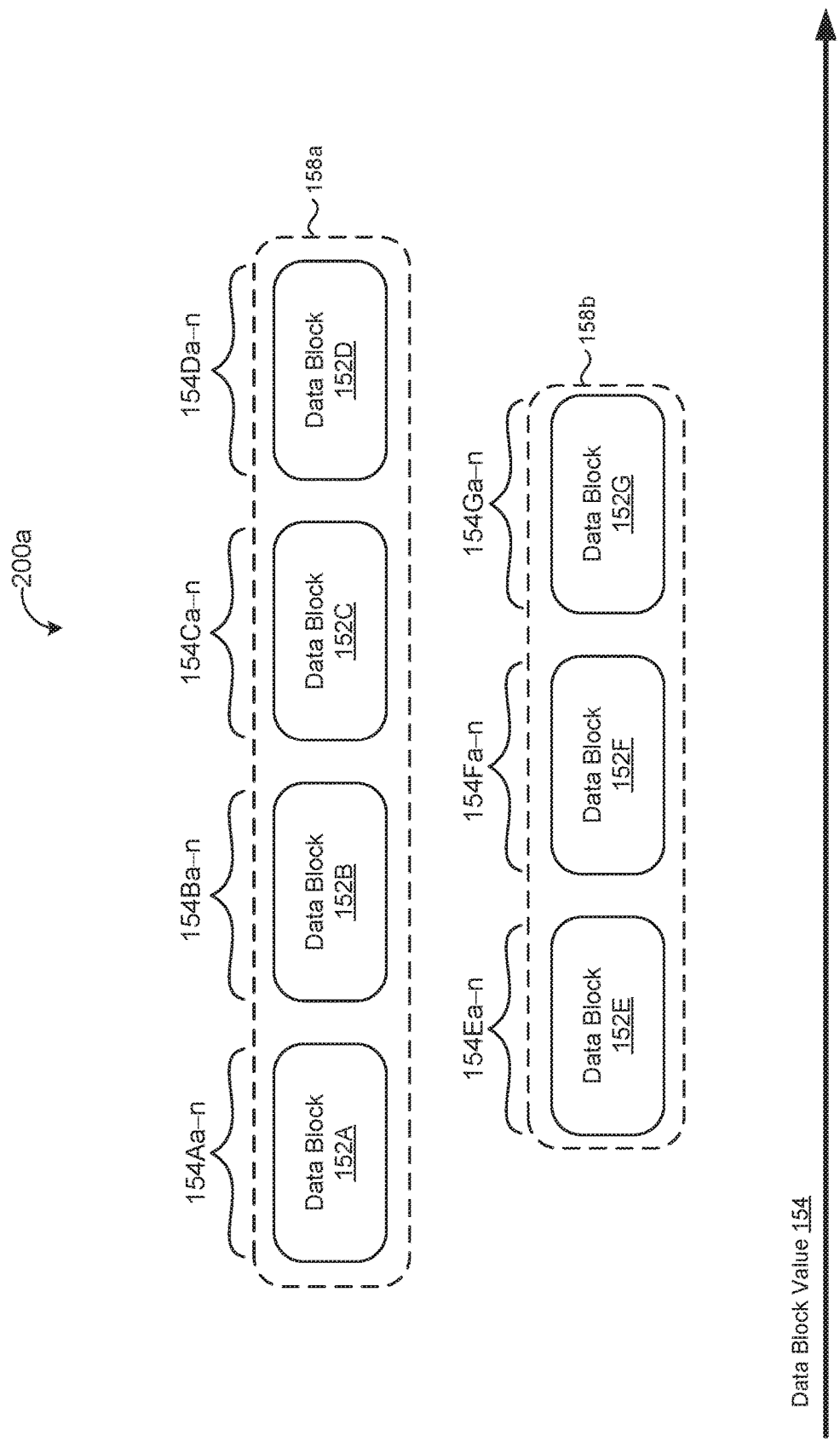
FIG. 2A is a schematic view of a graph of a first and second group of clustered data blocks over a range of clustering key values.

Referring now to FIG. 2A, a graph 200a shows an exemplary first group 158a and second group 158b of clustered data blocks 152 plotted along an x-axis of clustering key values 154. The first group 158a consists of data blocks 152a-d while the second group 158b consists of data blocks 152e-g. Each data block 152a-g includes a range 210, 210a-g of clustering key values 154. While none of the ranges 210 within each respective group 158a, 158b overlap, there is overlap between ranges 210 of data blocks 152 across the groups 158a, 158b. For example, the range 210e of data block 152e overlaps the ranges 210a, 210b of data blocks 152a, 152b. Thus, simply including all of the data blocks 152a-g into a single group 158 would result in performance loss due to the overlap.

Figure 2B:
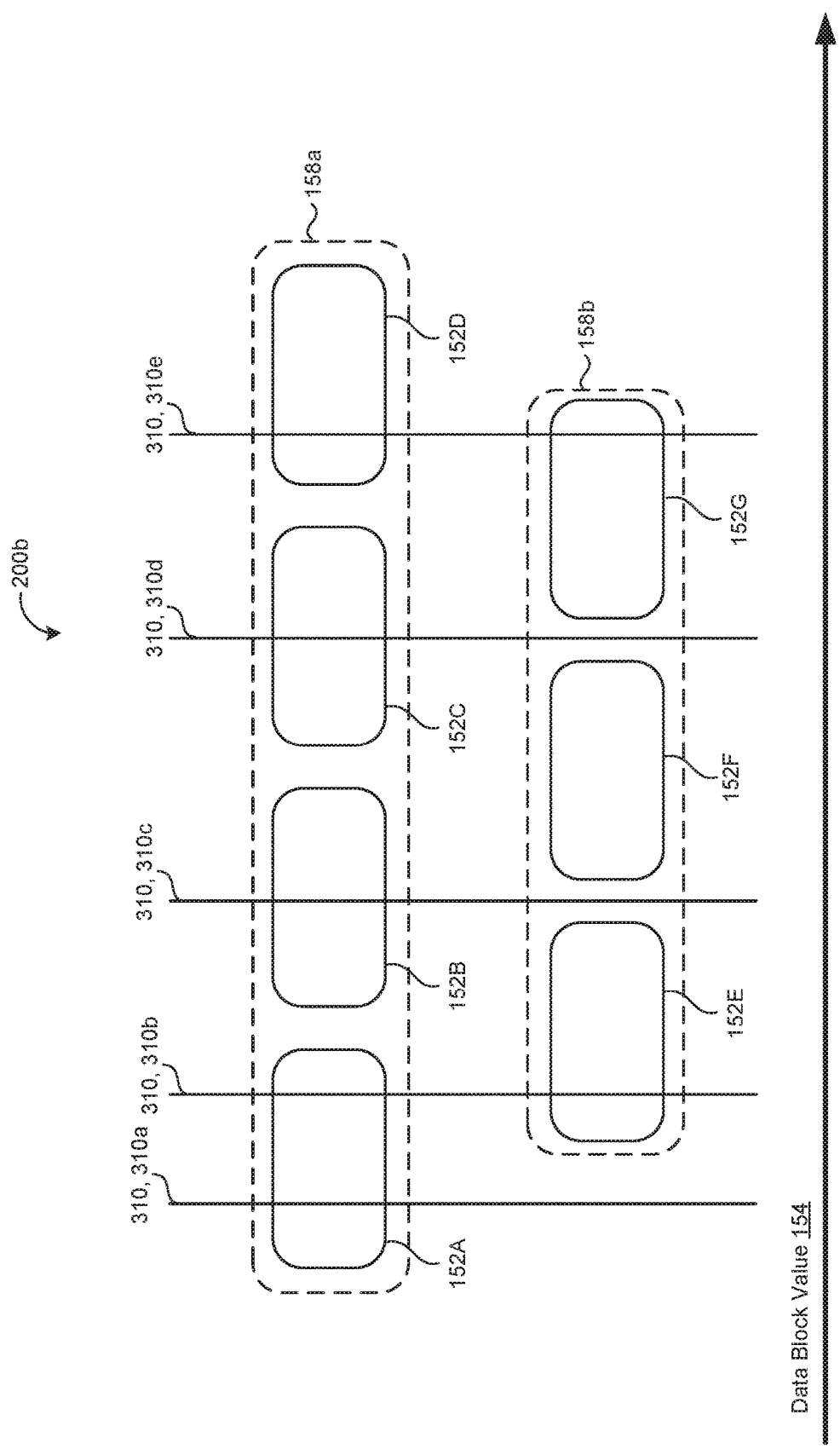
FIG. 2B is a schematic view of a graph of the first and second group of clustered data blocks over the range of clustering key values of FIG. 2A with a plurality of split points.

Referring now to FIG. 2B, a graph 200b illustrates the exemplary first group 158 and second group 158b of FIG. 2A graphed by clustering key values 154. Here, the split points 310 generated by the split point generator 170 partition some of the data blocks 152a-g. For example, a split point 310a partitions data block 152a while a split point 310b partitions data block 152a (in the first group 158a) and the data block 152e (in the second group 158b). Similarly, a split point 310c partitions data block 152b, a split point 310d partitions data block 152c, and a split point 310e partitions data block 152d and data block 152e.

Figure 2C:
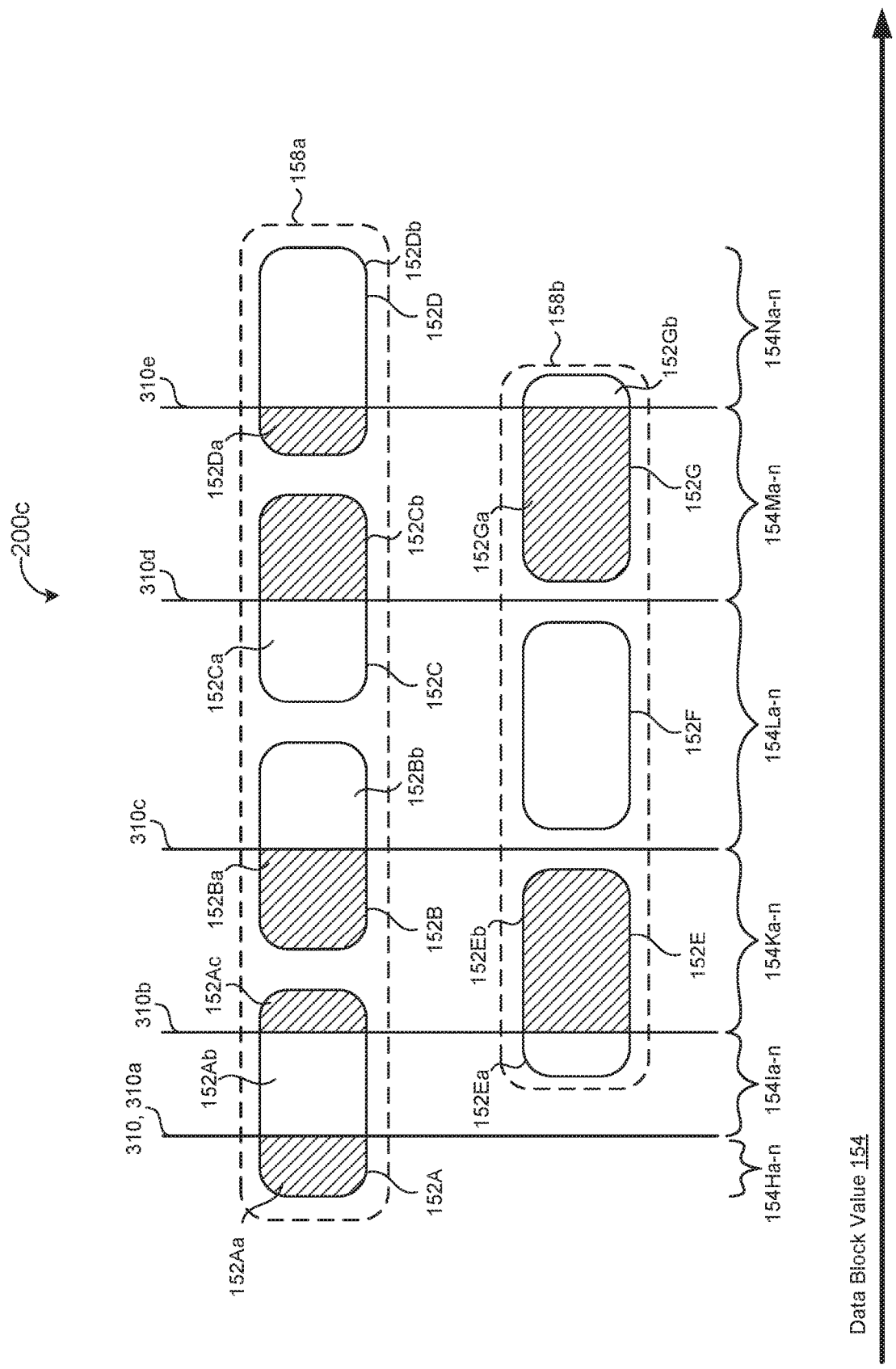
FIG. 2C is a schematic view of a graph of the first and second group of clustered data blocks of FIG. 2A indicating partitions based on the split points.
Figure 2D:
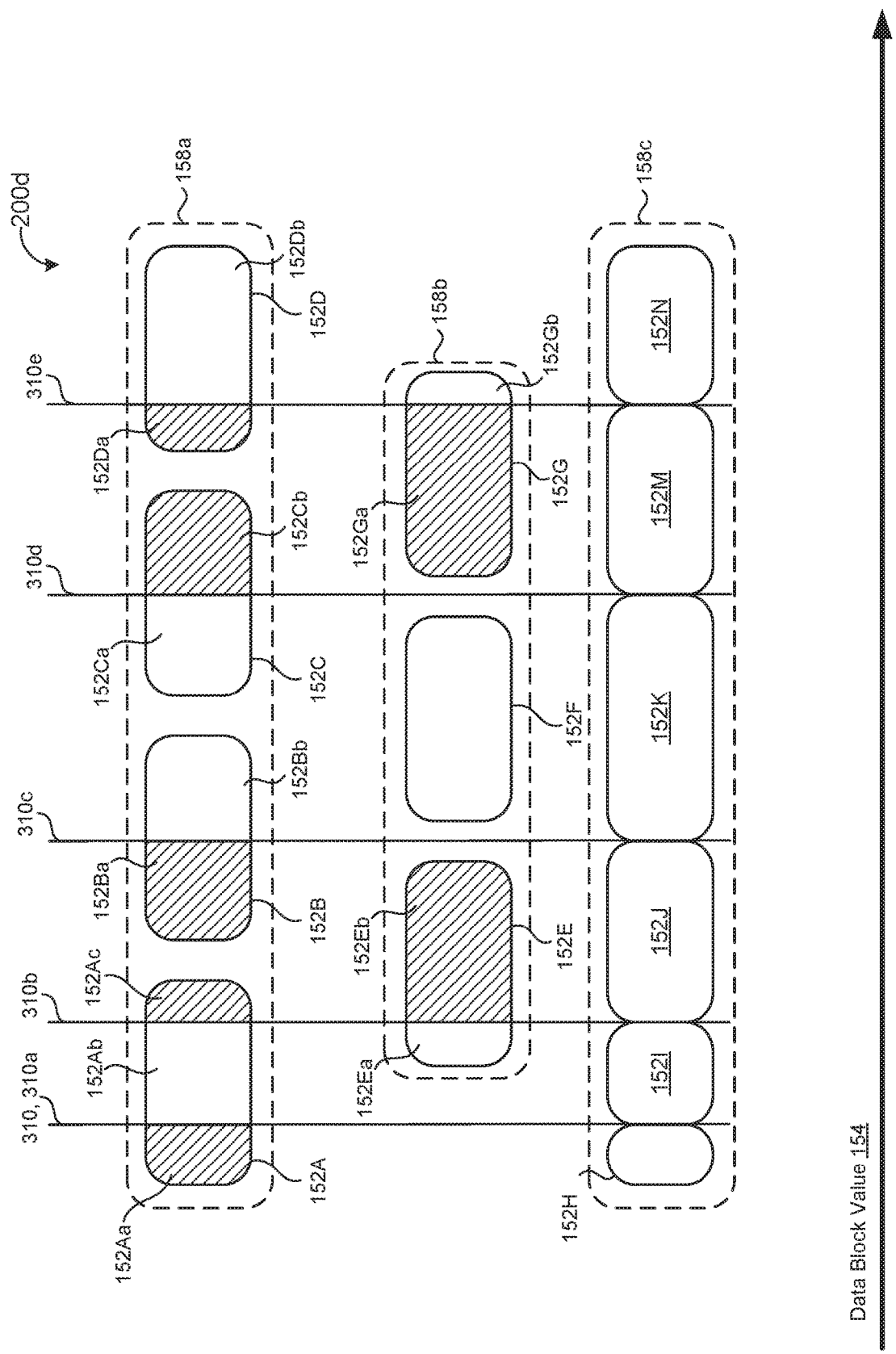
FIG. 2D is a schematic view of the first and second group of clustered data blocks of FIG. 2A merged to form a third group of clustered data blocks.

Referring now to FIGS. 2C and 2D, in some implementations, the data block partitioner 180 identifies which clustering key values 154 in the first group 158b of clustered data blocks 152 and the second group 158b of clustered data blocks 152 that fall between adjacent split points 310. For each clustered data block 152 in the third group 158c of clustered data blocks 152, the data block partitioner 180 merges the identified clustering key values 154 that fall within the corresponding adjacent split points 310. For example, a graph 200c indicates the portions of the data blocks 152a-g that fall within adjacent split points 310a-e. Here, the graph 200c illustrates that adjacent split points 310a, 310b partition data block 152a into portions 152aa, 152ab, 152ac and data block 152e into portions 152ea, 152eb (FIG. 2C). Similarly: data block 152b is split into portions 152ba, 152bb; data block 152c is split into portions 152ca, 152cb; data block 152d is split into portions 152da, 152db; and data block 152g is split into portions 152ga, 152gb. Note that data block 152f is not split into any portions, as no split points 310 pass through the data block 152f.

Each pair of adjacent split points 310 and end split point 310a, 310e form a range 410, 410a-f of clustering key values 154. In some examples, the data block partitioner 180 only reads the rows within each partition 410 and writes each data block 152 of the third group 158c (based on the read partition 410) to the data block data store 150. In some examples, the data block partitioner 180 only reads the column(s) that include the clustering key value 154 instead of the entire clustered table 159 to greatly reduce the total amount of data read. Optionally, only portions of data blocks 152 that overlap are read by data block partitioner 180. For example, the data block partitioner 180 does not read data block 152f when generating the data blocks 152 of the third group 158c as no split points 310 intersect with the data block 152f.

As shown by graph 200d of FIG. 2D, each data block 152h-n of the third group 158c is formed from the merged partitions of groups 158a, 158b within the same adjacent pair of split points 310. Here, because split point 310a is the left-most split point 310, the split point 310a does not have an adjacent split point 310 to the left, and therefore portion 152aa of data block 152a forms data block 152h of group 158c alone. Adjacent split points 310a, 310b bracket portions 152ab and 152ea, which are merged to form data block 152i. Similarly, adjacent split points 310b, 310c bound portions 152ac, 152ba, 152eb and merge to form 152j. Likewise, adjacent split point 310c, 310d bound portions 152bb, 152ca and data block 152f and merge to form data block 152k. Adjacent split points 310d, 310e bound portions 152cb, 152da, 152ga and merge to form data block 152m. Because split point 310e is the right-most split point 310, data block portions 152db, 152gb merge to form data block 152n.

Thus, in some examples, at least one clustered data block 152 in the third group 158c of clustered data blocks 152 (e.g., data block 152h) includes a portion (e.g., portion 152aa) of the respective range 210 from one of the data blocks 152 of the first or second groups 158a, 158b of clustered data blocks 152 that does not overlap with any of the respective ranges of the other clustered data blocks of the other one of the first or second groups 158a, 158b of clustered data blocks 152. In some implementations, at least one clustered data block 152 in the third group 158c of clustered data blocks 152 includes a portion (e.g., portion 152ab) of the respective range 210 from one of the data blocks 152 of the first or second groups 158a, 158b of clustered data blocks 152 and one of the data blocks 152 (e.g., portion 152ea) from the other one of the first or second groups 158a, 158 of clustered data blocks 152. Optionally, at least one clustered data block 152 in the third group 158c of clustered data blocks 152 includes a portion (e.g., portions 152ac, 152ba) of the respective range 210 from two of the data blocks 152 of the first or second groups 158a, 158b of clustered data blocks 152 and one of the data blocks 152 (e.g., portion 152eb) from the other one of the first or second groups 158a, 158b of clustered data blocks 152. That is, the split points 310 may partition the data blocks 152 into any number of portions and the data block partitioner 180 any merge any number of portions or data blocks 152 from the first group 158a or the second group 158b into data blocks 152 of the third group 158c.

Figure 2E:
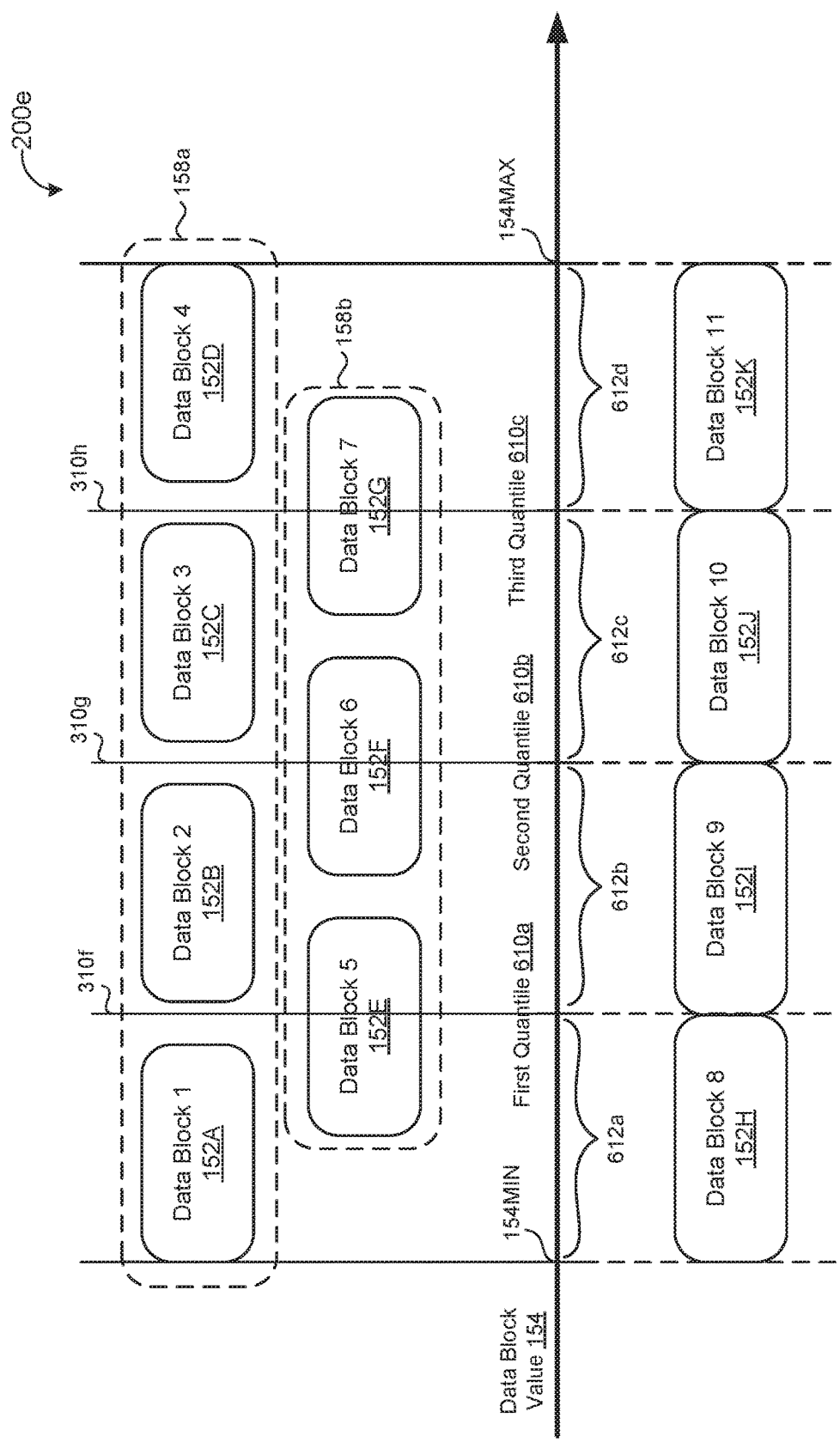
FIG. 2E is a schematic view of the first and second group of data blocks from FIG. 2 partitioned based on a plurality of quantiles.

Referring now to FIG. 2E, in some implementations, the split point generator 170 generates the one or more split points 310 by determining a plurality of quantiles 610, 610a-n for the first and second groups 158a, 158b of clustered data blocks 152. A quantile is a cut point that divides the range of a distribution into intervals with each interval having an equal or approximately equal distribution. For example, as illustrated by graph 200e, given a range of clustering key values 154 defined by a minimum clustering key value 154MIN and maximum clustering key value 154MAX (determined, in this example, by the minimum and maximum clustering key values 154 of the data blocks 152a-g of groups 158a, 158b), a first, second, and third quantile 610a-c divides the range 620 of the clustering key values 158 into four sub-ranges 612a-d. The first range 612a represents 25 percent (i.e., one fourth) of the distribution of clustering key values 154, and each of the other ranges 612b-c also represent 25 percent of the distribution of clustering key values 154. Each quantile 610 may represent a location for a split point 310, and thus the number of quantiles 610 is equivalent to the number of split points 310. That is, each split point 310 of the one or more split points 310 corresponds to a different quantile 610 of the plurality of quantiles 610.

The split point generator 170 may determine any number of quantiles 610 (and thus split points 310). The split point generator 170 may determine a number of the one or more split points 310 generated based on a number of data blocks 152 in the first and second groups 158a, 158b of clustered data blocks 152 and a size of each of the data blocks 152. In some examples, each data block 152 is a configurable size (e.g., 32 MB to 256 MB) and the split point generator 170 determines the number of quantiles 610 by determining a total size of the first group 158a and the second group 158b divided by the configured data block size. In the example shown, the split point generator 170 determines three quantiles 610a-610c (corresponding to three split points 310f-h) to divide the range 620 of clustering key values 154 into four sub-ranges 612a-d which each correspond to a data blocks 152h-k of the third group 158c of clustered data blocks 152.

In some examples, the split point generator determines one or more quantiles 610 of the data blocks 152 of the first and second groups 158a, 158b based on sampling the data of the data blocks 152. That is, due to the potentially enormous size of the clustered table 159, sampling the data allows the split point generator 170 to determine the quantiles 610 in a more efficient and scalable manner. In some implementations, the split point generator 170 uses weighted sampling to approximate one or more quantiles of the data blocks 152 of the first group 158a and the second group 158b of clustered data blocks 152. Alternatively, the split point generator 170 may generate the split points 310 using other means, such as ordered code. Ordered code provides a byte encoding of a sequence of typed items. The resulting bytes may be lexicographically compared to yield the same ordering as item-wise comparison on the original sequences. That is, ordered code has the property that comparing the ordered code yields the same result value as comparing values one by one.

Optionally, after partitioning the data blocks 152 into the third group 158c, the data block partitioner 180 determines a first sum of data values associated with the first and second groups 158a, 158b of clustered data blocks 152 and determines second sum of data values associated with the third group 158c of clustered data blocks 152. The data block partitioner verifies that the first sum is equivalent to the second sum. That is, to ensure that there was no data corruption during the partitioning process, the data block partitioner 180 verifies that values associated with the first and second groups 158a, 158b (e.g., summing a number of rows of the clustered table 159) is the same as the corresponding value of the third group 158c. These values will match when no data has been corrupted or misplaced. The total number of rows in the third group 158c should be equivalent to the total number of rows in the first group 158a summed with the total number of rows in the second group 158b.

Examples herein illustrate the data block reclusterer 160 performing shuffle-less reclustering of two groups 158 of clustered data blocks 152. However, this is exemplary only and any number of groups may be reclustered simultaneously. In some examples, the respective range of clustering key values 154 of the clustered data blocks 152 in the second group 158b do not overlap with the respective range of clustering key values 154 of the clustered data blocks 152 in the first group 158a of clustered data blocks 152. In this scenario, the data block reclusterer 160 may merge the data blocks without generating split points 310.

Figure 3:
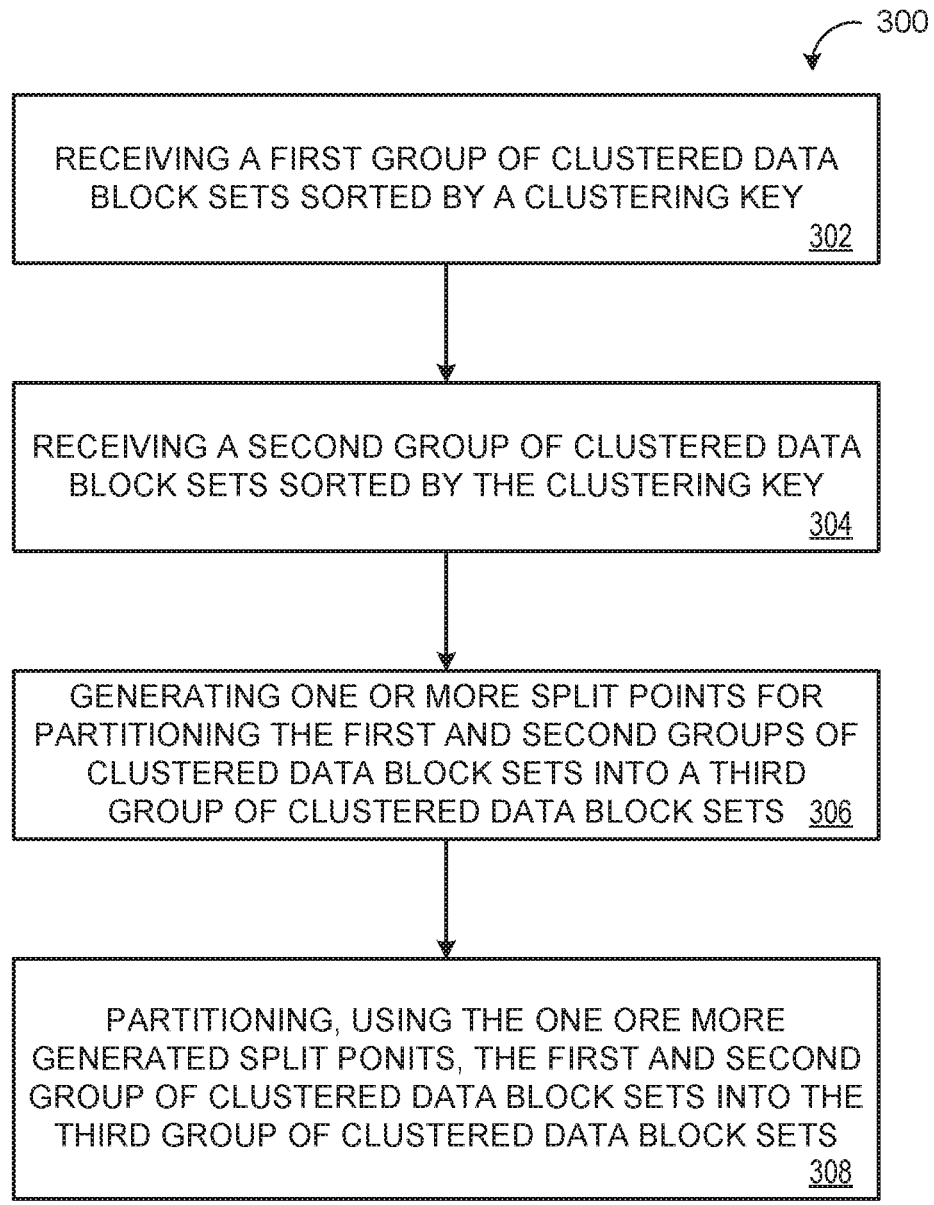
FIG. 3 is a flowchart of an example arrangement of operations for a method of shuffle-less reclustering of clustered tables.

FIG. 3 is a flowchart of an exemplary arrangement of operations for a method 300 of shuffle-less reclustering of clustered tables. The method 300 includes, at operation 302, receiving, at data processing hardware 144, a first group 158a of clustered data blocks 152 sorted by a clustering key value 154. Each clustered data block 152 in the first group 158a of clustered data blocks 152 includes a respective range 210 of the clustering key values 154 that do not overlap with any of the ranges 210 of clustering key values 154 of the other clustered data blocks 152 in the first group 158a of clustered data blocks 152.

At operation 304, the method 300 includes receiving, at the data processing hardware 144, a second group 158b of clustered data blocks 152 sorted by the clustering key value 154. Each clustered data block 152 in the second group 158b of clustered data blocks 152 includes a respective range 210 of clustering key values 154 that do not overlap with any of the ranges 210 of clustering key values 154 of the other clustered data blocks 152 in the second group 158b of clustered data blocks 152. The respective range 210 of clustering key values 154 of one or more the clustered data blocks 152 in the second group 158b of clustered data blocks 152 overlaps with the respective range 210 of clustering key values 154 of at least one of the clustered data blocks 152 in the first group 158a of clustered data blocks 152.

The method 300, at operation 306, includes generating, by the data processing hardware 144, one or more split points 310 for partitioning the first and second groups 158a, 158b of clustered data blocks 152 into a third group 158c of clustered data blocks. At operation 308, the method 300 includes partitioning, by the data processing hardware 144, using the one or more generated split points 310, the first and second groups 158a, 158b of clustered data blocks 152 into the third group 158c of clustered data blocks 152. Each clustered data block 152 in the third group 158c of clustered data blocks 152 includes a respective range 210 of clustering key values 154 that do not overlap with any of the ranges 210 of clustering key values 154 of the other clustered data blocks 152 in the third group 158c of clustered data blocks 152. Each split point 310 of the one or more generated split points 310 defines an upper limit or a lower limit for the respective range 210 of clustering key values 154 of one of the clustered data blocks 152 in the third group 158c of clustered data blocks 152.

Figure 4:
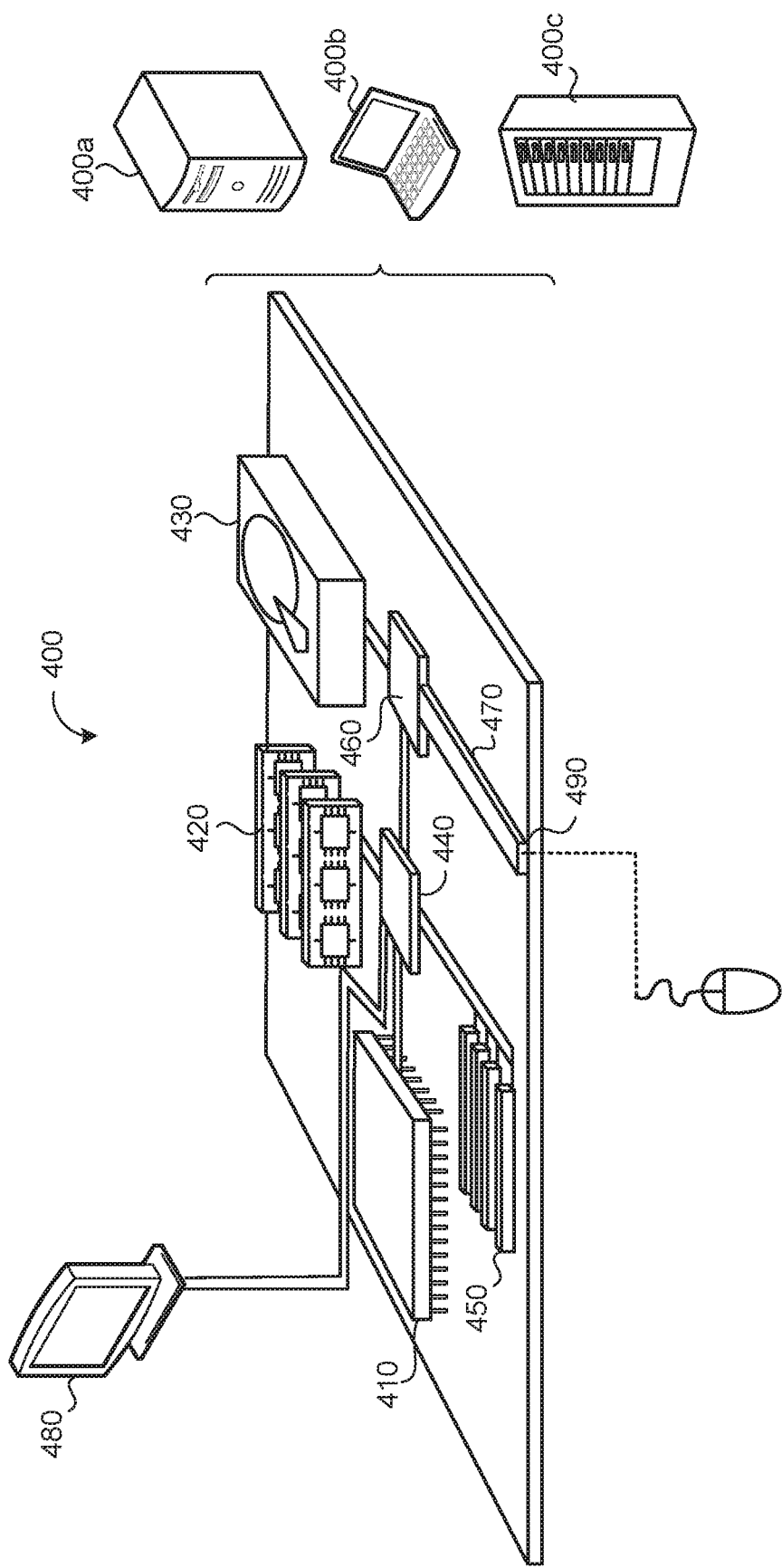
FIG. 4 is a schematic view of an example computing device that may be used to implement the systems and methods described herein.

FIG. 4 is schematic view of an example computing device 400 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
  receiving, at data processing hardware, a first group of clustered data blocks sorted by a clustering key value, each clustered data block in the first group of clustered data blocks comprising a respective range of the clustering key values that do not overlap with any of the ranges of clustering key values of the other clustered data blocks in the first group of clustered data blocks;

receiving, at the data processing hardware, a second group of clustered data blocks sorted by the clustering key value, each clustered data block in the second group of clustered data blocks comprising a respective range of clustering key values that do not overlap with any of the ranges of clustering key values of the other clustered data blocks in the second group of clustered data blocks;

generating, by the data processing hardware, one or more split points for partitioning the first and second groups of clustered data blocks into a third group of clustered data blocks;

partitioning, by the data processing hardware, using the one or more generated split points, the first and second groups of clustered data blocks into the third group of clustered data blocks, each clustered data block in the third group of clustered data blocks comprising a respective range of clustering key values that do not overlap with any of the ranges of clustering key values of the other clustered data blocks in the third group of clustered data blocks, wherein each split point of the one or more generated split points defines an upper limit or a lower limit for the respective range of clustering key values of one of the clustered data blocks in the third group of clustered data blocks;

determining, by the data processing hardware, a first sum of data values associated with the first and second groups of clustered data blocks;

determining, by the data processing hardware, a second sum of data values associated with the third group of clustered data blocks; and verifying, by the data processing hardware, that the first sum is equivalent to the second sum.

2. The method of claim 1, wherein a columnar database table stores the first and second groups of clustered data blocks.

3. The method of claim 1, wherein a number of the one or more split points generated is based on a number of data blocks in the first and second groups of clustered data blocks and a size of each of the data blocks.

4. The method of claim 1, wherein partitioning the first and second groups of clustered data blocks into the third group of clustered data blocks occurs without performing any shuffling operation on the data blocks in the first and second groups of clustered data blocks.

5. The method of claim 1, wherein partitioning the first and second groups of clustered data blocks into the third group of clustered data blocks comprises:
identifying which clustering key values in the first group of clustered data blocks and the second group of clustered data blocks fall between adjacent split points; and
for each clustered data block in the third group of clustered data blocks, merging the identified clustering key values that fall within the corresponding adjacent split points.

6. The method of claim 1, wherein at least one clustered data block in the third group of clustered data blocks comprises a portion of the respective range from one of the data blocks of the first or second groups of clustered data blocks that does not overlap with any of the respective ranges of the other clustered data blocks of the other one of the first or second groups of clustered data blocks.

7. The method of claim 1, wherein at least one clustered data block in the third group of clustered data blocks comprises a portion of the respective range from one of the data blocks of the first or second groups of clustered data blocks and one of the data blocks from the other one of the first or second groups of clustered data blocks.

8. The method of claim 1, wherein at least one clustered data block in the third group of clustered data blocks comprises a portion of the respective range from two of the data blocks of the first or second groups of clustered data blocks and one of the data blocks from the other one of the first or second groups of clustered data blocks.

9. The method of claim 1, wherein generating the one or more split points comprises determining a plurality of quantiles for the first and second groups of clustered data blocks.

10. The method of claim 9, wherein each split point of the one or more split points corresponds to a different quantile of the plurality of quantiles.

11. The method of claim 1, wherein the respective range of clustering key values of one or more the clustered data blocks in the second group of clustered data blocks overlaps with the respective range of clustering key values of at least one of the clustered data blocks in the first group of clustered data blocks.

12. A system comprising:
data processing hardware; and
memory hardware in communication with the data processing hardware, the memory hardware storing instructions that when executed on the data processing hardware cause the data processing hardware to perform operations comprising:
receiving a first group of clustered data blocks sorted by a clustering key value, each clustered data block in the first group of clustered data blocks comprising a respective range of the clustering key values that do not overlap with any of the ranges of clustering key values of the other clustered data blocks in the first group of clustered data blocks;
receiving a second group of clustered data blocks sorted by the clustering key value, each clustered data block in the second group of clustered data blocks comprising a respective range of clustering key values that do not overlap with any of the ranges of clustering key values of the other clustered data blocks in the second group of clustered data blocks, wherein the respective range of clustering key values of one or more the clustered data blocks in the second group of clustered data blocks overlaps with the respective range of clustering key values of at least one of the clustered data blocks in the first group of clustered data blocks;
generating one or more split points for partitioning the first and second groups of clustered data blocks into a third group of clustered data blocks;
partitioning using the one or more generated split points, the first and second groups of clustered data blocks into the third group of clustered data blocks, each clustered data block in the third group of clustered data blocks comprising a respective range of clustering key values that do not overlap with any of the ranges of clustering key values of the other clustered data blocks in the third group of clustered data blocks, wherein each split point of the one or more generated split points defines an upper limit or a lower limit for the respective range of clustering key values of one of the clustered data blocks in the third group of clustered data blocks determining a first sum of data values associated with the first and second groups of clustered data blocks;
determining a second sum of data values associated with the third group of clustered data blocks; and verifying that the first sum is equivalent to the second sum.

13. The system of claim 12, wherein a columnar database table stores the first and second groups of clustered data blocks.

14. The system of claim 12, wherein a number of the one or more split points generated is based on a number of data blocks in the first and second groups of clustered data blocks and a size of each of the data blocks.

15. The system of claim 12, wherein partitioning the first and second groups of clustered data blocks into the third group of clustered data blocks occurs without performing any shuffling operation on the data blocks in the first and second groups of clustered data blocks.

16. The system of claim 12, wherein partitioning the first and second groups of clustered data blocks into the third group of clustered data blocks comprises:

identifying which clustering key values in the first group of clustered data blocks and the second group of clustered data blocks fall between adjacent split points; and for each clustered data block in the third group of clustered data blocks, merging the identified clustering key values that fall within the corresponding adjacent split points.

17. The system of claim 12, wherein at least one clustered data block in the third group of clustered data blocks comprises a portion of the respective range from one of the data blocks of the first or second groups of clustered data blocks that does not overlap with any of the respective ranges of the other clustered data blocks of the other one of the first or second groups of clustered data blocks.

18. The system of claim 12, wherein at least one clustered data block in the third group of clustered data blocks comprises a portion of the respective range from one of the data blocks of the first or second groups of clustered data blocks and one of the data blocks from the other one of the first or second groups of clustered data blocks.

19. The system of claim 12, wherein at least one clustered data block in the third group of clustered data blocks comprises a portion of the respective range from two of the data blocks of the first or second groups of clustered data blocks and one of the data blocks from the other one of the first or second groups of clustered data blocks.

20. The system of claim 12, wherein generating the one or more split points comprises determining a plurality of quantiles for the first and second groups of clustered data blocks.

21. The system of claim 20, wherein each split point of the one or more split points corresponds to a different quantile of the plurality of quantiles.

22. The system of claim 12, wherein the respective range of clustering key values of one or more the clustered data blocks in the second group of clustered data blocks overlaps with the respective range of clustering key values of at least one of the clustered data blocks in the first group of clustered data blocks.

* * * * *